United States Patent Office 3,037,317
Patented June 5, 1962

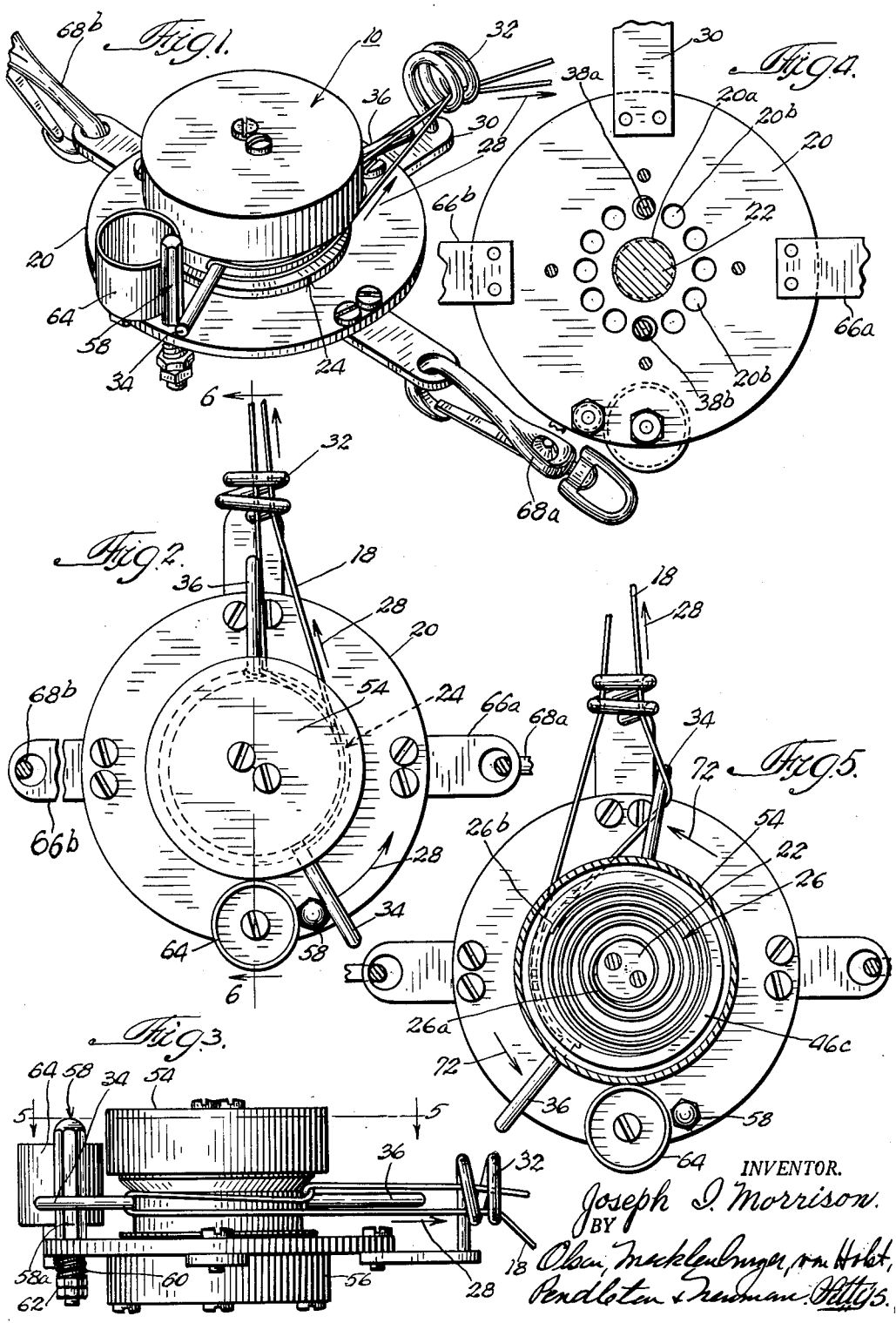

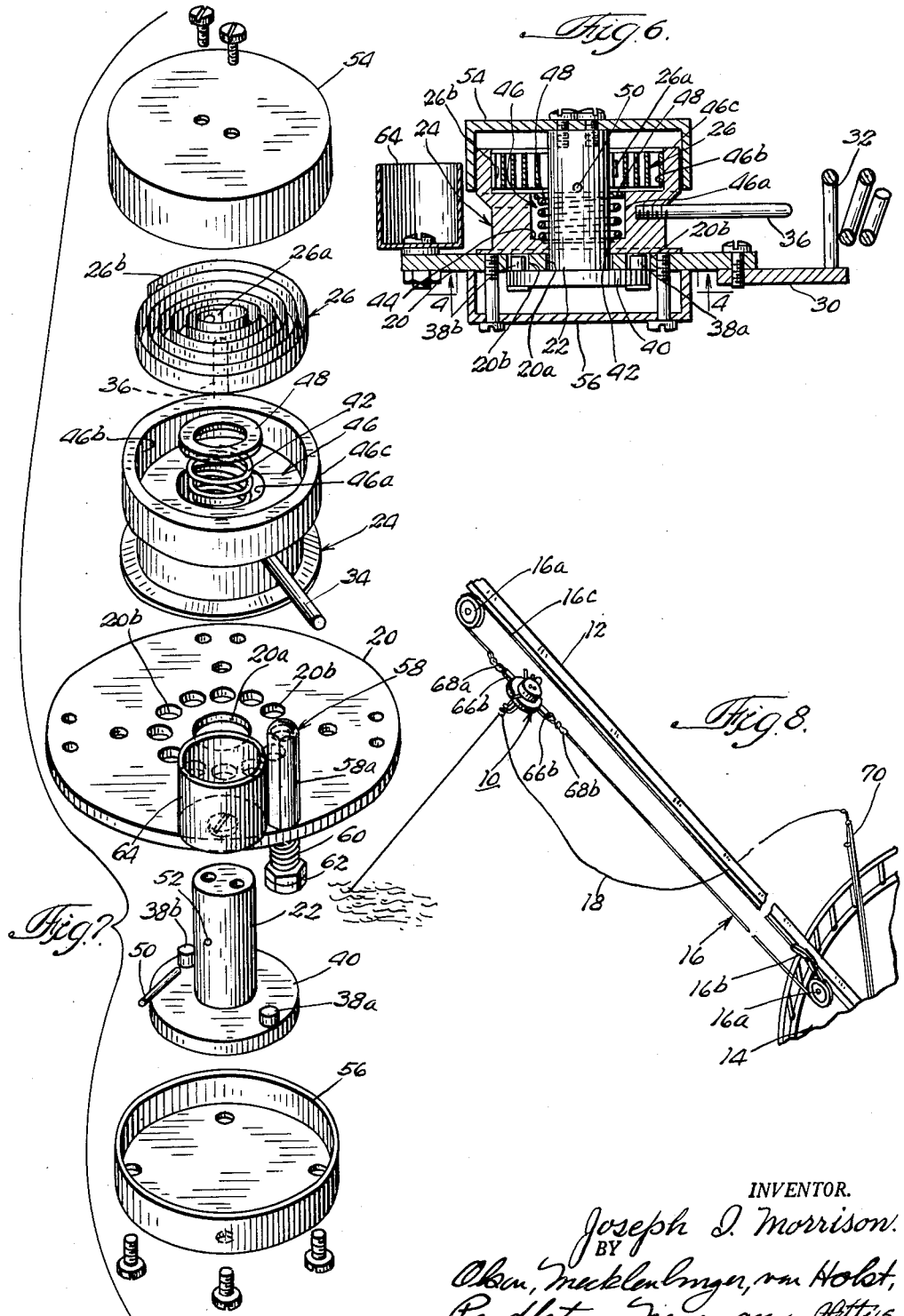

3,037,317
LINE RELEASING DEVICE
Joseph I. Morrison, Lincolnwood, Ill.; Grace F. Morrison and John O. Levinson, executors of said Joseph I. Morrison, deceased
Filed Sept. 1, 1959, Ser. No. 837,450
12 Claims. (Cl. 43—43.12)

This invention pertains to fishing devices and more particularly to a release device for laying out slack in a fishing line while immediately notifying the fisherman that a strike has been made.

In deep water fishing, from several fishing lines attached to outriggers arranged along the sides of a boat, baited hooks are trolled through the water. As a prospective catch approaches it normally strikes bait on one of the hooks a sharp blow with its bill. From this instant the pursued bait should remain motionless, as normal prey would react, while the prospective catch circles back. Only after it returns and actually takes the bait may the hook embedded therein be assuredly set in its mouth.

Those engaged in this type of fishing have long sought to overcome the particular problem of simulating the reactions of normal prey, especially when one person may control the boat, as well as watch the fishing lines, and immediately reduce the boat speed so as to let the bait lie still when a strike occurs. To solve this problem various devices have heretofore been used to instantaneously lay out a small amount of line slack in order to allow a short interval in which to throttle down. However, devices used to date have all been subject to numerous drawbacks.

Most devices, constructed to withstand a predetermined drag, are not readily adjustable to different tensions which result from changing boat speeds, from varying types or sizes of bait, or from various surface conditions of the water in which the bait is being trolled. Moreover, these devices are likely to pinch the line while such devices are being positioned on the outrigger, causing the line to fray or become weakened at one point or another. In addition, such devices are often not readily adapted to varying sizes of lines or are awkward to handle when they are positioned on the outrigger and frequently involve time-consuming or precarious resetting, even when adjustments can be made. Some prior devices are capable of being used only once and are lost when a strike is made, regardless of whether a fish is ultimately caught. Another disadvantage of prior devices is that they fail to immediately notify the fisherman of a strike unless he happens to be watching the particular line at the time; constant observing of the device might be a difficult feat when several lines are being fished simultaneously.

Accordingly it is one object of the present invention to provide a release device which is readily adjustable on the spot to changing sea conditions and to varying amounts of tension on a trailing line.

Another object of the invention is to provide an outrigger release for a fishing line which avoids weakening the line, accommodates various types and sizes of line, and is reusable.

Still another object of the invention is to provide a line releasing device which gives an immediate signal to the operator when the line is released so that he need not attempt to keep the device or line under constant surveillance.

Other objects and advantages will become more apparent from an examination of the following detailed description taken in conjunction with the accompanying drawings.

According to one embodiment of the invention there is provided an outrigger release comprising, in combination, an axle, a spool rotatably mounted about the axle and having means on the spool for engaging a line, tensioning means intermediate the spool and the axle for urging rotation of the spool about the axle in one direction, and a stop means restricting rotation of the spool urged by the tensioning means.

Particular reference is made, at this point, to the accompanying drawings in which:

FIGURE 1 is a perspective view of one embodiment of a line releasing device showing a line engaged thereon;
FIG. 2 is a top plan view of FIG. 1;
FIG. 3 is a right side elevational view of the device shown in FIG. 2;
FIG. 4 is a fragmentary sectional view taken along line 4—4 of FIG. 6;
FIG. 5 is a sectional view taken along line 5—5 of FIG. 3; but showing the spool of the device in a changed position during an initial strike being made of the trolled bait.
FIG. 6 is a sectional view taken along the line 6—6 of FIG. 2;
FIG. 7 is an exploded view of the device shown in FIG. 1; and
FIG. 8 is a fragmentary perspective view showing the improved device mounted on an outrigger.

Referring more particularly to the drawings, in FIG. 8 one embodiment of an improved line-releasing device 10 is shown which is adapted to be adjustably mounted on the distal end of an outrigger 12, when the latter is secured to the side of a boat 14 and extends angularly outwardly and upwardly therefrom. The employment of outriggers in this manner is well known in the art. Adjustment of the release 10 relative to the outrigger is effected in this instance through a pulley system 16 mounted on the outrigger as shown in FIG. 8. The pulley system includes a pair of longitudinally spaced sheaves 16a affixed to opposite end portions of the outrigger; a cleat 16b disposed adjacent the lower, or inboard, end of the outrigger; and a hank of rope 16c engaging said sheaves and having the ends thereof affixed to the release 10 in a manner to be more fully described hereinafter.

In the broad sense the function of the outrigger and release is twofold; namely, (a) to position a fishing line 18, to which the bait is attached, away from the side of the boat so as to eliminate the possibility of entanglement of the line with the propeller of the boat and with other lines being fished from the same boat; and (b) the more important of the two functions; namely, to provide the necessary slack in line 18 so upon the initial strike of the bait by the prospective catch, the bait will stop dead in the water while the catch makes a sudden turnabout before making a final lunge and strike at the bait. The sudden stopping in the water of the bait, which is normally a small-size fish—particularly in deep sea fishing—upon the initial strike, simulates the actions of a normal prey and thus, fools the prospective catch into making the final lunge. Thus, the slack in the line occasioned by the outrigger and release relieves the fisherman from constantly fingering or observing his rod and reel. In addition, the slack permits greater control in the maneuvering of the boat.

The improved release 10, as seen more clearly in FIG. 6, comprises the following basic elements; a base plate 20 of annular configuration, and axle 22 rotatable about its longitudinal axis and extending through a central opening 20a formed in said base plate, a spool 24 for accommodating a portion of the fishing line and in encompassing relation with said axle, and a tensioning means such as a flat coiled first spring 26 having one end thereof 26a affixed to said axle and the other end thereof 26b connected to the spool for urging rotation of the spool about the axle in one direction. The spring 26 functions to permit variation in the resistance to rotating of the spool and thus enables the fisherman to adjust the tension of the release so as to compensate for the variations in drag force on the line 18 due to surface conditions of the water, the size and type of bait and line being used, and the speed at which the boat is moving. Arrows 28, shown in FIG. 1, indicate the direction of the drag force on line 18.

Mounted on the periphery of base plate 20 and extending radially therefrom is an arm 30 to which is affixed a line-carrying loop or eyelet 32. The loop is for the purpose of threading a portion of line 18 therethrough when the line is brought into engagement with the spool.

Radially extending and relatively spaced arms 34 and 36, affixed to the periphery of spool 24 and urged in an arcuate path along with the spool by the flat spring 26, serve the dual function of facilitating engagement of the line on the spool and of producing an auditory signal indicating that the line has become disengaged from the release and that a strike of the bait has occurred. The method of threading the line 18 about the spool 24 and arms 34 and 36 will be described more fully hereinafter.

A clutch means for releasably engaging the axle upon the plate is provided as follows. Axle 22, as heretofore mentioned, extends through the central opening 20a of plate 20, and the longitudinal axis thereof is disposed normal to the plane of the plate. Symmetrically arranged about and spaced from the perimeter of central opening 20a are a plurality of relatively small apertures 20b adapted to be selectively accommodated by a pair of diametrically arranged upright pins or sprockets 38a and 38b, which are carried by a disc piece 40, the latter, in turn, being affixed to one end of axle 22.

To effect disengagement of pins 38a and 38b from the selected diametrically opposed apertures 20b, the upper end of axle 22, as seen in FIG. 6, is depressed an amount sufficient to permit the pins to clear plate 20, whereupon the axle is free to be rotated relative to the plate and thus either increase or decrease the spring tension of the coil spring. The pins remain in accommodated relation with the selected apertures 20b, by reason of a coil second spring 42 which encompasses a portion of axle 22, see FIG. 6. The lower end of spring 42 abuts a shoulder 44 formed in the lower end of a bore 46 formed in spool 24. The upper end of spring 42, on the other hand, abuts a washer 48 which is limited in its upward movement relative to axle 22 by a transversely extending, removably mounted pin 50. The pin is disposed within a bore 52 formed in axle 22, see FIG. 7. The spool 24, about which line 18 is positioned, is provided, as heretofore mentioned, with a bore 46 which is double counterbored from its upper end as shown in FIG. 6 to form two superimposed pockets 46a and 46b. In pocket 46a is disposed coil spring 42. In the other pocket 46b is positioned flat coil spring 26 which, although affixed to the axle and within an outer peripheral rim portion 46c extending from the spool, is sufficiently resilient to permit axial movement of axle 22.

Ordinarily it will be advisable to provide a cap 54, which is affixed to the axle and which fits loosely over the rim of the spool, not only for some degree of protection against foreign material that would inhibit free movement of the parts but also to enable easy gripping and turning of the axle. The cap should not fit too tightly, however, since the spool must be allowed to turn freely and since, when tension on the flat spring is to be varied, the cap must be pushed closer to the base plate in order to depress the axle.

Another cap 56 may be provided, if desired, over the disc in order to further protect the mechanism from foreign matter, such as dirt or seaweed. While cap 56 is illustrated only for this purpose, it is intended by the appended claims to include a construction (not shown) in which second spring 42 is compressed between cap 56 and disc 40, rather than, as shown, between washer 48 and the base of bore 46.

Stop 58, which is positioned in the path of the arms 34 and 36, limits rotation of the spool by arresting arm 34. As shown, in FIG. 3, the stop 58 comprises a metal peg 58a inserted through an enlarged hole in the base plate, a short spring 60 encompassing the end of the stop projecting beyond the underside of the plate, and small locking nuts 62 threaded onto the projecting end of the stop and compressing the spring 60 against the underside of the plate. A short distance away from peg 58a is a bell 64 mounted on the base plate so that a sharp rap on the stop will cause it to flex and strike the bell. Spring 60 immediately after the bell is struck by the peg urges the latter away from the bell, permitting the bell to vibrate and produce a noise clearly audible to persons aboard the boat and indicating return of arm 34 against the stop and disengagement of the line 18 from the spool 24.

Mounted on plate 20 and extending radially therefrom are a pair of diametrically opposed arms 66a and 66b to the outer end of which are connected clips 68a and 68b. The clips in turn are secured to the ends of rope 16c which forms a part of the pulley system for the outrigger.

In operating the release 10 it is first fastened by means of clips 68a and 68b to the ends of rope 16c. To rig the release preparatory to fishing and usually while all of fishing line 18 is still in the boat, a portion between the ends of the line is drawn through eyelet 32 and over arm 34; a second loop is formed from the same intermediate portion and given a twist before placing it endwise of arm 36, and gently pulling it taut so that the line binds upon itself about the latter arm, as seen in FIGS. 2 and 3. After estimating the drag on the line to be exerted by the surface condition of the water, and the selected bait, adequate tension is applied to the device by adjusting pins 38a and 38b in apertures 20b. A hook on one end of the line is then baited and placed in the water while the other end of the line, leading directly from arm 36, runs back to the fishing rod 70. A small amount of slack to be laid out should be left in the line between the device and the fishing rod when the device is run out on the pulley system to the end of the outrigger. Rope 16c is then wound about cleat 16b to maintain the release 10 at any appropriate place intermediate sheaves 16a.

If, by running the device out to a desired position on the outrigger, it is found that the original estimate of necessary tension was incorrect, the device is simply pulled close to the side of the boat, a new tension is put on, and the device is repositioned out on the outrigger. If desired, indicator marks (not shown) for spring tension may be calibrated on cap 54.

As the baited hook is trolled the changing resistance against spring 26 caused by the bait skipping in and out of the water along the surface will ordinarily make arm 34 vacillate a short distance away from stop 58, much as shown in FIG. 1 but normally the vacillations are not of such magnitude as to flex peg 58a sufficiently to cause it to strike the bell. However, when a strike occurs at the end of the line leading directly from arm 34, the force of spring 26 is overcome and the spool rotates in the direction shown by the arrows 72 in FIG. 5 against the spring until the line slips endwise off arm 34 when the latter is aligned with eyelet 32. FIG. 5 shows the spool in a position of rotary adjustment just prior to the arm 34 assuming the aligned position with the eyelet. Once the line force loop slips endwise off arm 34, the spool is then rotated in the opposite direction in response to the tugs on the portion of the line remaining around arm 36 and the urging of the spring to allow the line to subsequently slip endwise off the latter arm and out through the eyelet. Substantially simultaneously with the line slipping off arm 36, the arm 34 snaps back against the stop 58 causing peg 58a to flex and strike bell 64, thus notifying the vessel operator of a strike.

Several lines, each with its own release device, may obviously be fished simultaneously, the only duty of the operator in this regard being to reduce speed immediately as soon as he hears one of the bells.

It will be immediately apparent that various modifications may be made without departing from the principles indicated herein, but such modifications as fall within the true spirit and scope of the invention are to be understood as being included in the appended claims.

I claim:

1. An outrigger release comprising, in combination, an axle, a spool rotatably mounted about the axle and having means thereon movable therewith for releasably engaging a line, tensioning means affixed to the spool and having a portion thereof disposed intermediate the spool and the axle for urging rotation of the spool about the axle in one direction, means for setting a predetermined adequate amount of tension upon said tensioning means, and a stop means for engaging said means for releasing the line to limit rotation of the spool urged by the tensioning means.

2. An outrigger release comprising, in combination, an axle, a base member adjacent the axle, a spool rotatably mounted about the axle and having means thereon movable therewith for releasably engaging a line, tensioning means affixed to the spool and having a portion thereof disposed intermediate the spool and the axle for urging rotation of the spool about the axle in one direction, means for setting a predetermined adequate amount of tension upon said tensioning means, and a stop means positioned on the base member for engaging said means for releasing the line to limit rotation of the spool urged by the tensioning means.

3. An outrigger release comprising, in combination, an axle, a base member adjacent one end of the axle, clutch means for releasably engaging the axle upon the base member, a spool rotatably mounted about the axle and having means thereon movable therewith for releasably engaging a line, tensioning means affixed to the spool and having a portion thereof disposed intermediate the spool and the axle and responsive to said clutch means for receiving a predetermined adequate amount of tension therefrom for urging rotation of the spool about the axle in one direction, and a stop means positioned on the base member for engaging said means for releasing the line to limit rotation of the spool urged by the tensioning means.

4. An outrigger release comprising, in combination, an axle, a base member apertured to receive one end of the axle therethrough, means for releasably engaging the axle upon the base member, a spool rotatably mounted about the axle, tensioning means affixed to the spool and having a portion thereof disposed intermediate the spool and the axle for urging rotation of the spool about the axle and responsive to said means for releasably engaging the axle for receiving a predetermined adequate amount of tension therefrom in one direction, arms affixed to the periphery of the spool and urged in an arcuate path along with the spool by the tensioning means, and a stop means positioned on the base member and in the path of the arms to limit rotation of the spool urged by the tensioning means.

5. An outrigger release comprising, in combination, an axle, a base member apertured to receive one end of the axle therethrough, clutch means for releasably engaging the axle upon the base member, spring means adjacent the axle compressed toward the base member and the clutch means to maintain engagement of the axle upon the base member, a spool rotatably mounted about the axle, tensioning means intermediate the spool and the axle for urging rotation of the spool about the axle in one direction, arms affixed to the periphery of the spool and urged in an arcuate path along with the spool by the tensioning means, and a stop means positioned on the base member and in the path of the arms restricting rotation of the spool urged by the tensioning means.

6. An outrigger release comprising, in combination, an axle, a base member apertured to receive one end of the axle therethrough, a plurality of sprockets on the axle releasably engaging the base member, a spool rotatably mounted about the axle and having a pocket surrounding the axle, a spring positioned within the pocket and engaging the axle to urge the sprockets into engagement with the base member, tensioning means intermediate the spool and the axle for urging rotation of the spool about the axle in one direction, arms affixed to the periphery of the spool and urged in an arcuate path along with the spool by the tensioning means, and a stop means positioned on the base member and in the path of the arms restricting rotation of the spool urged by the tensioning means.

7. An outrigger release comprising, in combination, an axle, a base member apertured to receive one end of the axle therethrough, a plurality of sprockets on the axle releasably engaging the base member, a spool rotatably mounted about the axle and having a pocket surrounding the axle, a spring positioned within the pocket and engaging the axle to urge the sprockets into engagement with the base member, tensioning means intermediate the spool and the axle for urging rotation of the spool about the axle in one direction, arms affixed to the periphery of the spool and urged in an arcuate path along with a stop means positioned on the base member and in the path of the arms restricting rotation of the spool urged by the tensioning means, and means for indicating each return of one of the arms against the stop means.

8. An outrigger release comprising, in combination, an axle, a base member apertured to receive one end of the axle therethrough, a plurality of sprockets on the axle releasably engaging the base member, a spool rotatably mounted about the axle and having a pocket surrounding the axle, a spring positioned within the pocket and engaging the axle to urge the sprockets into engagement with the base member, tensioning means intermediate the spool and the axle for urging rotation of the spool about the axle in one direction, arms affixed to the periphery of the spool and urged in an arcuate path along with the spool by the tensioning means, a stop means flexibly attached to the base member and in the path of the arms restricting rotation of the spool urged by the tensioning means, and a bell adjacent the stop means and responsive to movement thereof for indicating each return of one of the arms against the top means.

9. An outrigger release comprising, in combination, an axle, a base member apertured to receive one end of the axle therethrough, a plurality of sprockets on the axle releasably engaging the base member, a spool rotatably mounted about the axle and having a pocket surrounding the axle, an outer peripheral rim on the spool extending from one face thereof, a spring positioned within the pocket and helically engaging the axle to urge the sprockets into engagement with the base member, tensioning means affixed within the rim and on the axle for urging rotation of the spool about the axle in one direction, arms affixed to the periphery of the spool and urged in an arcuate path along with the spool by the tensioning means, a stop means flexibly attached to the base member and in the path of the arms restricting rotation of the spool urged by the tensioning means, and a bell adjacent the stop means and responsive to movement thereof for indicating each return of one of the arms against the stop means.

10. A fishing device comprising, in combination, an axle, a base member apertured to receive one end of the axle therethrough, a plurality of sprockets on the axle releasably engaging the base member, a spool rotatably mounted about the axle and having a pocket surrounding the axle, a spring positioned within the pocket and helically engaging the axle to urge the sprockets into engagement with the base member, an outer peripheral rim on the spool extending from one face thereof, tensioning means affixed within the rim and on the axle for urging rotation of the spool about the axle in one direction, arms affixed to the periphery of the spool and urged in an arcuate path along with the spool by the tensioning means, a stop means flexibly attached to the base member and in the path of the arms restricting rotation of the spool urged by the tensioning means, a bell adjacent the stop means and responsive to movement thereof for indicating each return of one of the arms against the stop means, and a fishing line wound on the arms and releasable by revolution of the spool against the tensioning means.

11. A fishing device comprising, in combination, an axle, a base member apertured to receive one end of the axle therethrough, a plurality of sprockets on the axle releasably engaging the base member, a spool rotatably mounted about the axle and having a pocket surrounding the axle, a spring positioned within the pocket and helically engaging the axle to urge the sprockets into engagement with the base member, an outer peripheral rim on the spool extending from one face thereof, tensioning means affixed within the rim and on the axle for urging rotation of the spool about the axle in one direction, at least two arms affixed to the periphery of the spool and urged in an arcuate path along with the spool by the tensioning means, a stop means flexibly attached to the base member and in the path of the arms restricting rotation of the spool urged by the tensioning means, a bell adjacent the stop means and responsive to movement thereof for indicating each return of one of the arms against the stop means, an eyelet extending from the base member toward the path of the arms, one of the arms being positioned at rest against the stop means and another of the arms extending toward the eyelet, and a fishing line wound through the eyelet onto the arms and releasable by revolution of the spool against the tensioning means.

12. An outrigger release comprising, in combination, an axle, a spool rotatably mounted about the axle and having means thereon movable therewith for releasably engaging a line, tensioning means affixed to the spool and having a portion thereof disposed intermediate the spool and the axle for urging rotation of the spool and the line releasing means in one direction about the axle, means for setting a predetermined adequate amount of tension upon said tensioning means, stop means disposed adjacent to the spool and arranged to engage the line releasing means to limit rotation of the spool in the direction urged by the tensioning means, and a line wound onto the line releasing means, said line being releasable by revolution of the spool in a direction to move the line releasing means away from the stop means.

References Cited in the file of this patent
UNITED STATES PATENTS

| | | |
|---|---|---|
| 2,461,356 | Sus et al. | Feb. 8, 1949 |
| 2,730,832 | Mathers | Jan. 17, 1956 |
| 2,899,768 | Steinauer | Aug. 18, 1959 |